United States Patent [19]

Amacker

[11] Patent Number: 5,332,063
[45] Date of Patent: Jul. 26, 1994

[54] LADDER STAND

[76] Inventor: Joseph A. Amacker, 1212 Main St., Delhi, La. 71232

[21] Appl. No.: 999,165

[22] Filed: Dec. 31, 1992

Related U.S. Application Data

[63] Continuation-in-part of Ser. No. 977,158, Nov. 16, 1992, Pat. No. 5,285,868, and Ser. No. 818,262, Jan. 8, 1992, Pat. No. 5,249,644, and Ser. No. 818,120, Jan. 8, 1992.

[51] Int. Cl.$^5$ .................................................. A45F 3/26
[52] U.S. Cl. ................................... 182/116; 182/187; 182/206
[58] Field of Search ........ 182/116, 187, 188, 133–136, 182/206

[56] References Cited

U.S. PATENT DOCUMENTS

| | | |
|---|---|---|
| 857,430 | 6/1907 | Youngquist et al. . |
| 932,232 | 8/1909 | Adams . |
| 1,091,277 | 3/1914 | Bloom . |
| 2,605,074 | 7/1952 | Bucsko et al. . |
| 2,837,260 | 6/1958 | Kinnett ........................... 182/116 X |
| 3,485,320 | 12/1969 | Jones . |
| 4,061,202 | 12/1977 | Campbell . |
| 4,225,013 | 9/1980 | Sample . |
| 4,321,983 | 3/1982 | Nelson . |
| 4,331,216 | 5/1982 | Amacker . |
| 4,368,800 | 1/1983 | Campbell . |
| 4,428,459 | 1/1984 | Peck . |
| 4,549,633 | 10/1985 | Merritt . |
| 4,552,247 | 11/1985 | Purdy ........................... 182/116 X |
| 4,553,634 | 11/1985 | Roberts et al. . |
| 4,582,165 | 4/1986 | Latini . |
| 4,597,473 | 7/1986 | Peck . |
| 4,834,217 | 5/1989 | Manes . |
| 4,942,942 | 7/1990 | Bradley . |
| 4,969,538 | 11/1990 | Amacker . |
| 4,995,475 | 2/1991 | Berkbuegler . |
| 4,997,063 | 3/1991 | Bradley . |
| 5,009,283 | 4/1991 | Prejean ........................... 182/187 X |
| 5,016,733 | 5/1991 | Bradley . |
| 5,103,935 | 4/1992 | Amacker . |
| 5,143,176 | 9/1992 | Burdette . |

FOREIGN PATENT DOCUMENTS

| | | |
|---|---|---|
| 239473 | 10/1911 | Fed. Rep. of Germany ...... 182/116 |
| 427522 | 4/1926 | Fed. Rep. of Germany ...... 182/133 |
| 904719 | 1/1954 | Fed. Rep. of Germany . |
| 2627175 | 8/1989 | France . |
| 2657021 | 7/1991 | France . |
| 2657022 | 7/1991 | France . |
| 2664822 | 1/1992 | France . |
| 8000794 | 5/1980 | World Int. Prop. O. . |

*Primary Examiner*—Alvin C. Chin-Shue
*Attorney, Agent, or Firm*—Wigman, Cohen, Leitner & Myers

[57] ABSTRACT

The invention relates to a ladder stand for an upright columnar member such as a tree, pole or the like.

The stand includes a pair of jaws, one of which is remotely moveable so that the platform can be safely secured to the tree before the ladder is climbed. After the user climbs down, the jaws can be disengaged from the tree and the ladder stand removed.

14 Claims, 3 Drawing Sheets

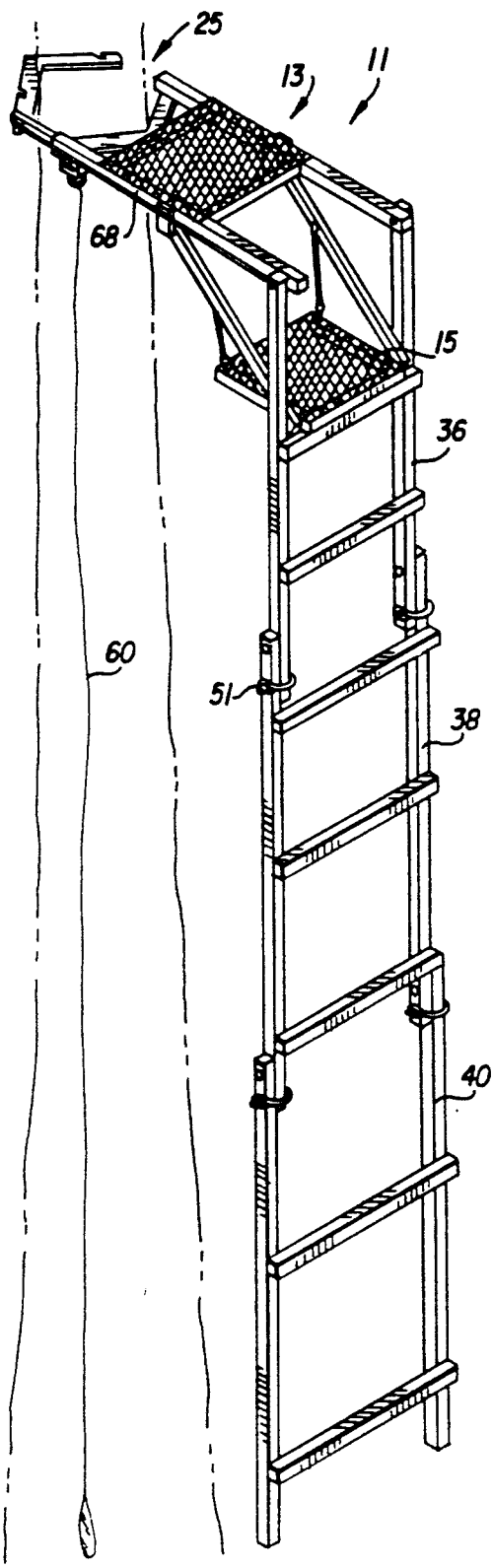
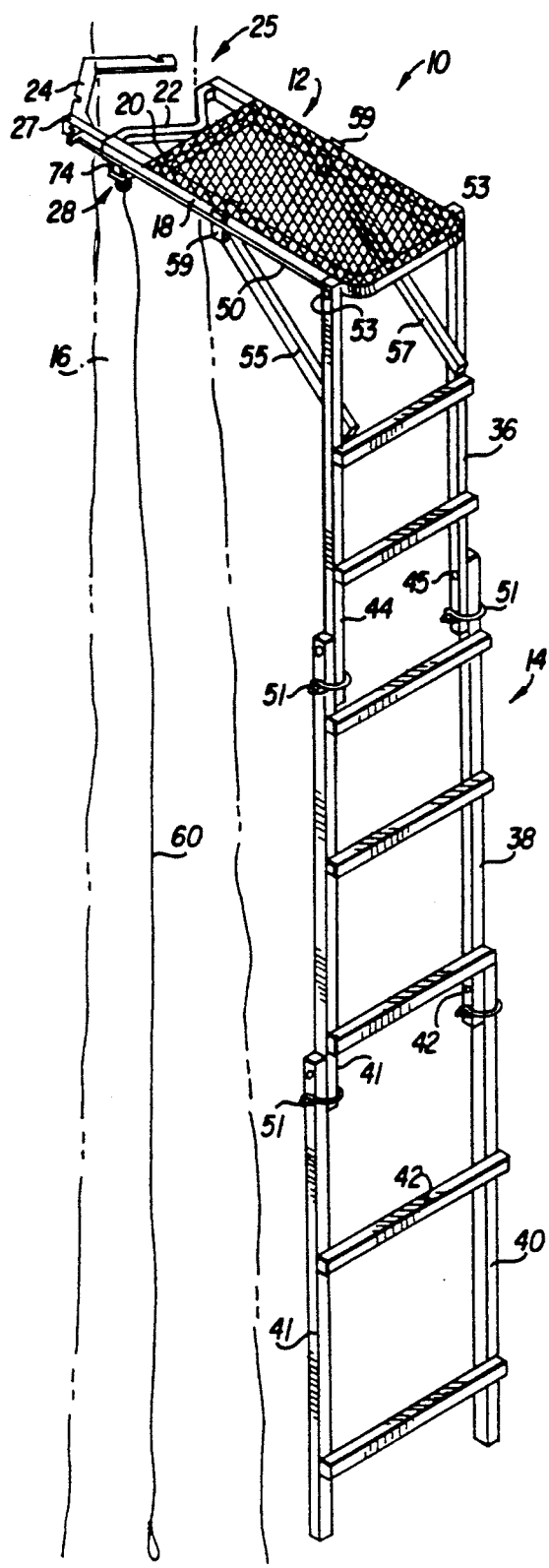

LADDER STAND

CROSS-REFERENCE TO RELATED APPLICATION

This is a continuation-in-part to my copending applications: Ser. No. 07/977,158 filed Nov. 16, 1992 U.S. Pat. No. 5,285,868, issued Feb. 15, 1994; Ser. No. 07/818,262 filed Jan. 8, 1992 U.S. Pat. No. 5,249,644, issued Oct. 5, 1993; and Ser. No. 07/818,120 filed Jan. 8, 1992.

BACKGROUND OF THE INVENTION

1. Field of the Invention

The present invention relates to ladder stands which are used by hunters, wildlife photographers, bird watchers or telephone linemen. More particularly, the present invention relates to ladder stands which are secured to upright columnar members such as trees, poles or the like, and which include one or more platforms.

2. Description of the Prior Art

Conventional ladder stands commonly used by hunters and others generally comprise a ladder having at one end a horizontal seat or platform mounted perpendicular to the side rails of the ladder. In use, the ladder is extended, and leaned against the tree. The user climbs the ladder and sits on the upper platform, sometimes for an extended period of time waiting for a deer or other animals to show or, if used by telephone linemen, the linemen performs repairs from the platform.

A key disadvantage of such devices is their inherent instability. In particular, with conventional devices the ladder functions not only for climbing but also as a vertical support for the platform. In order to best support the platform, the ladder must be positioned perpendicular to the ground. This, however, is not the ideal position for climbing. Rather, it is best for climbing to position the ladder at a slight acute angle relative to the tree. To overcome the instability of conventional ladder stands, a strap or chain is manually wrapped around the tree trunk to secure the ladder or the platform to the tree. However, the chain or strap has been found ineffective in preventing the ladder from falling while being climbed, especially while the user is climbing the portion of the ladder above the chain and before the platform can be secured to the tree.

The need for stability is pressing during ascent due to the climber's shifting weight. More importantly, during descent, after spending many hours on the platform, the user may be cold and disoriented. When the upper platform chain is disconnected and the user begins climbing down, there is a real possibility that the platform will sway sufficiently to cause the user to fall.

According to the federal government's National Center for Health Statistics, falls from tree stands have become the leading cause of death among deer hunters. In a Georgia study of deer hunting accidents for the period 1986-1989, the majority of accidents involved tree stands. The study found that 75 percent of the falls resulted in severe injuries and that 25 percent resulted in death or permanent paralysis. It is believed that falls from ladder stands in particular contribute to a seizable proportion of these statistics.

OBJECTS AND SUMMARY OF THE INVENTION

In view of the foregoing limitations and shortcomings of the prior art devices, as well as other disadvantages not specifically mentioned above, it should be apparent that there still exists a need in the art for a ladder stand which is safe and simple to use, and is stable both during climbing as well as while the user is perched on the platform.

It is, therefore, a primary objective of this invention to fulfill this need by providing a safe and stable ladder stand wherein the upper platform is directly and independently secured to the tree prior to and during ascent, descent and use.

Another object of the invention is to provide a ladder stand having an upper platform which can be secured to the tree by the user prior to making his ascent and which can be released from the tree after descent.

Yet another object of the invention is to provide a ladder stand wherein the ladder may be positioned at an angle relative to the tree rather than parallel to the tree as with conventional ladder stands so that it is easier to climb.

Still another object of the invention is to provide a ladder stand which, when locked in place, offers side support in any direction, thus eliminating the danger of falling when the hunter is shooting from awkward positions.

These and other objects are achieved by the ladder stand of the present invention which is safe to use, foldable and easy to carry, is durable, and relatively inexpensive.

The ladder stand of the present invention includes an upper platform section to accommodate the body of the user in a standing or sitting position and a ladder section hingedly mounted thereto. The ladder stand is provided with a gripping device adapted to grip an upright columnar member such as a tree, pole or the like. It is a particular advantage of the present invention that the gripping device may be activated from the ground, before the ladder is climbed, and is released by the user after safely descending from the platform while on the ground. Because the ladder is mounted to the platform, which, in turn, is adapted to grip the tree, the ladder of the present invention is supported from the top.

The ladder section is comprised of several hingedly connected sub-sections which may be extended and locked in an elongated position while in use and thereafter folded for carrying and storage.

The platform is preferably made of a lightweight aluminum tubular material which has an expanded metal sheet mounted thereon. The gripping device is ajacent the platform and includes an adjustable throat portion which engages the tree by means of opposing jaw members which initially allow the tree to be received therein and thereafter can be closed to engage a substantial portion of the circumference of the tree. In particular, the throat portion is formed by a front jaw which is fixedly mounted to the platform section and a rear jaw which is adjustable and preferably telescopically mounted to a supporting arm carried by the platform frame. Each jaw has a hook or bow-like shape with its concave side facing the tree. Teeth-like protrusions may be separately or integrally formed on one or both jaws to improve its tree gripping characteristic.

The rear jaw is adjustable relative to the front jaw to accommodate vertical members having a wide range of diameters. The support arm which carries the rear jaw is preferably telescopingly mounted to one side of the platform. Other sliding or moveable mechanisms may also be used in lieu of a telescoping arm mechanism. The moveable support arm may be longitudinally fixed relative to the platform section by a spring-tensioned locking pin adapted to engage any one of an array of spaced-apart engagement holes disposed in the support arm.

A resilient member, such as an elastic cord or spring, biases the moveable rear jaw toward the opposing fixed front jaw. Hence, when the spring-biased locking pin is disengaged from the hole disposed in the support arm, the resilient member immediately causes the throat portion to close and for the jaws to engage the tree.

Importantly, this automatic jaw closure can be easily and inexpensively accomplished from the ground by means of a long cord attached to the locking pin which the user can pull on. This allows the user to place the ladder stand on the tree and securely lock the platform to the tree prior to making his ascent. Similarly, after the user has safely climbed down the ladder and is on the ground, the platform can be unlocked from the tree in accordance with the present invention by means of the cord/locking device action. Alternative methods of releasing the locking pin such as remote operated electrical devices are also contemplated. Accordingly, the present invention will significantly reduce the number of accidents involving ladder stands.

Adjustable backpack-style carrying straps are attached to the platform portion for ease in transporting the ladder stand. When not in use, the straps are folded and stored within recesses formed in insulative seat cushion material layered on the platform portion.

With the foregoing and other objects, advantages and features of the invention that will become hereinafter apparent, the nature of the invention may be more clearly understood by reference to the following detailed description of the invention, the appended claims and to the several views illustrated in the drawings.

BRIEF DESCRIPTION OF THE DRAWINGS

FIG. 1 is a perspective view of the present invention shown in engagement with a tree.

FIG. 2 is a perspective view of a second embodiment of the present invention.

DETAILED DESCRIPTION OF PREFERRED EMBODIMENTS

Referring now in detail to the drawings, wherein like parts are designated by like numerals throughout the several views, there is illustrated in FIG. 1 a first embodiment of the invention designated generally as ladder stand 10. Ladder stand 10 generally includes a platform section 12 and a ladder section 14. The platform section 12 is shown in secured engagement with the circumference of a tree. It should be appreciated however, that the present invention is suitable for use in association with other upright columnar members such as utility poles and the like. (Hence, reference in this specification to "trees" should be construed to include other upright columnar members.)

Figure 4:
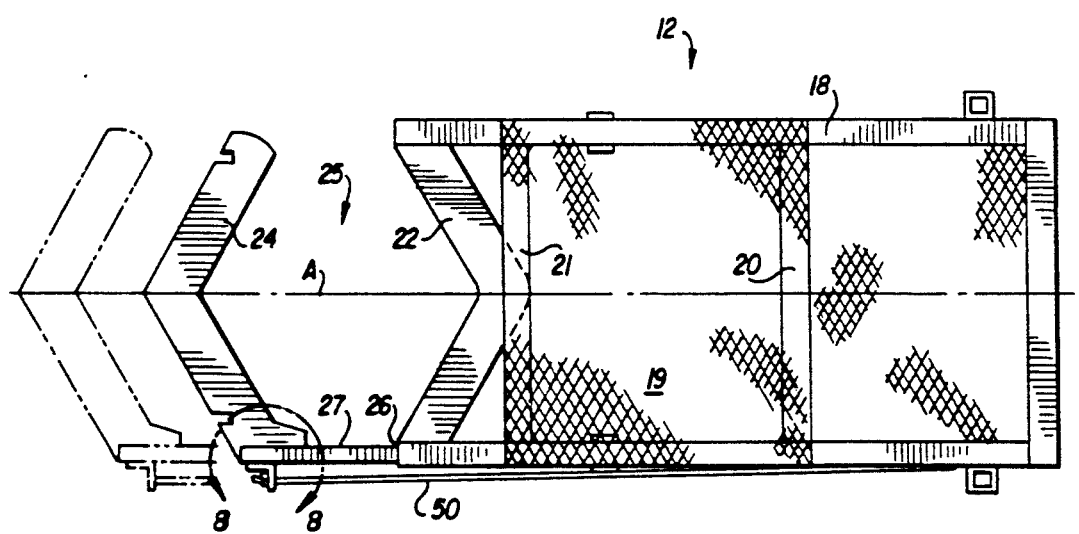
FIG. 4 is a top plan view of the platform section of the first embodiment of the present invention.

As best viewed in FIG. 4, platform member 12 of the first embodiment, preferably constructed of a sturdy metal, such as sheet steel or aluminum, is comprised of a U-shaped tubular frame 18, and a pair of cross members or braces 20, 21. A floor 19 made of expanded metal is welded to the frame 18 along its perimeter. If needed, additional intermediate structural supports can be provided.

Tubular frame 18 is preferably formed in one piece of extruded aluminum having a generally square cross-section. At one of its terminal ends 26, support arm 27—which carries rear jaw 24—is slidably received by the tubular frame.

In a second embodiment 11 (FIGS. 2 and 3) platform member 13 includes a foot rest 15. The remaining components of second embodiment 11 are substantially identical to those described with the first embodiment 10.

Platform member 12 is secured to the columnar member 16 by a pair of jaws 22, 24 which form an adjustable throat 25 to accomodate trees of varying girths. Rear jaw 24 is moveable with respect to front jaw 22. Jaws 22, 24 are similar in design to the clamping portion and platform portion described in my copending application Ser. No. 07/977,158 filed Nov. 16, 1992, titled "Hook-Type Tree Climbing Stand", as well as its parent application Ser. No. 07/818,262, filed Jan. 8, 1992, both of which are incorporated herein by reference.

Front jaw 22 is fixed to platform 12 and comprises a generally hook or bow-shaped member similar to those used in conventional tree stands and adapted to engage the side of tree 16 from which the platform extends. Rear jaw 24 is moveable and adapted to engage the side of the tree opposite the side engaged by jaw 22 when the ladder stand is in use.

Jaws 22, 24 are constructed of a relatively stiff and strong metal such as steel, and are preferably arranged so that their concave surfaces face each other to circumscribe and grip tree 16. The jaws form an adjustable throat 25 which is remotely openable by the user in a manner described hereinafter. The apex jaws 22, 24 preferably coincides with a line of symmetry A. An array of teeth-like protrusions (not shown) may be mounted or integrally formed along the forward edge of either jaw member to prevent slippage with the tree. The teeth-like projections can be covered with a rubber sheathing, if required by state law to protect the tree from injury caused by the impacting protrusions.

Figure 5:
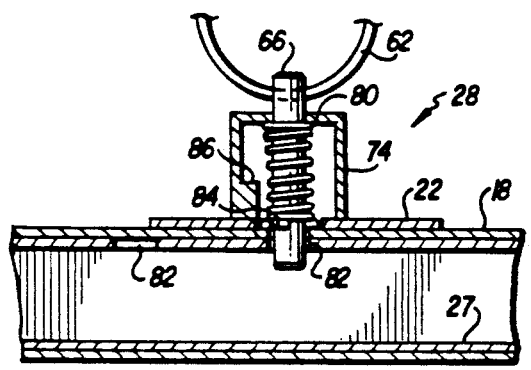
FIG. 5 is a sectional view of the platform section locking pin assembly of the present invention.

To lock moveable rear jaw 24 relative to jaw 22 a locking pin assembly 28 is provided (FIG. 5). Locking pin assembly 28 is comprised of a housing 74 preferably mounted to the underside of tubular frame member 18 adjacent the terminal portion of member 18 on the side that receives support arm 27. In this way, locking pin assembly 28 can be operatively connected with support arm 27 to fix rear jaw 24 in one or more desired positions.

Referring to FIG. 5, locking pin assembly 28 includes pin 66 which is mounted within the housing and biased downwardly by a spring 80. Pin 66 extends through an opening provided in member 18 which is aligned with the opening in front jaw member 22. Support arm 27 includes a plurality of aligned holes 82 which are of a size to receive pin 66 therethrough. A pin keeper 84 extends from a lower portion of pin 66 and engages housing shoulder or block 86 when pin 66 is lifted and turned approximately 90° so as to hold pin 66 out of hole 82. A ring 62 is attached to pin 66. A cord 60, attached to ring 62, is made sufficiently long to enable the user to remotely activate pin 66 while standing on the ground. When ring 62 is pulled against the bias of spring 80, pin 66 disengages from aperture 82 thereby freeing support arm 27 to slide relative to tubular member 18.

In lieu of cord 60, it is contemplated that other means may be provided to activate pin 66 such as an electromagnet controlled by a hand-held radio transmitter or an electric switch mounted at the base of the ladder and connected to the electromagnet by a wire. Other locking devices may be employed. What is important to the invention is the ability of the user to engage jaws around the tree thereby securing the platform and stabilizing the ladder before the ladder is climbed either up or down.

The adjustment feature of the ladder stand of the present invention is similar to that described in my co-pending application Ser. No. 07/818,120, titled "Automatically Adjustable Tree Climbing Stand", the subject matter of which is incorporated herein by reference.

Figure 7:
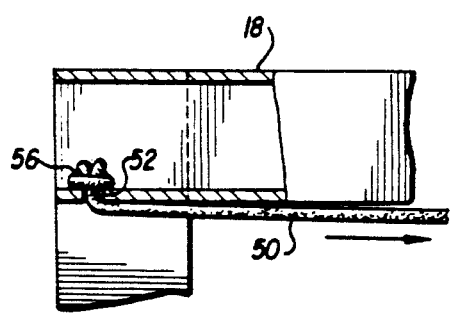
FIG. 7 is an enlarged elevational view partly broken away of the area 8 of FIG. 3.
Figure 8:
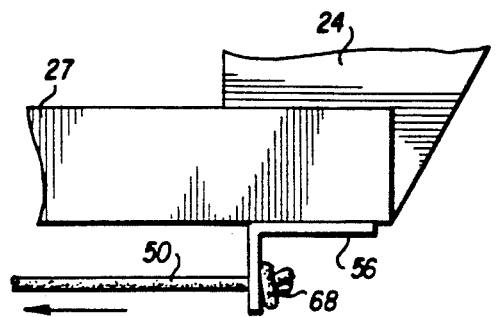
FIG. 8 is an enlarged elevational view of the area 9 of FIG. 4.

As seen in FIGS. 7, 8 moveable rear jaw 24 is biased toward fixed front jaw 22 by a resilient biasing member 50 which may comprise an elastic cord or a spring. It is also contemplated that the rear jaw 24 is fixed and the front jaw 22 is moveable, or, both can be moveable. Preferably, the resilient biasing member 50 is attached to the frame 18 by being fitted through a hole 52 at the end of frame 18 and secured by a knot and washer 56, or a similar means (FIG. 7). The other end of the biasing member 50 is attached to support arm 27 through a hole in a flange 56 securely affixed to the end of support arm 27 adjacent the jaw 24, by another knot 68. (FIG. 8) By such construction, rear jaw 24 may be automatically moved toward the opposing front jaw 22 when released by pulling the pin 66 out of hole 82 thereby enabling the support arm 27, to move and carry the jaw 24 into a secured relationship with the tree.

Figure 3:
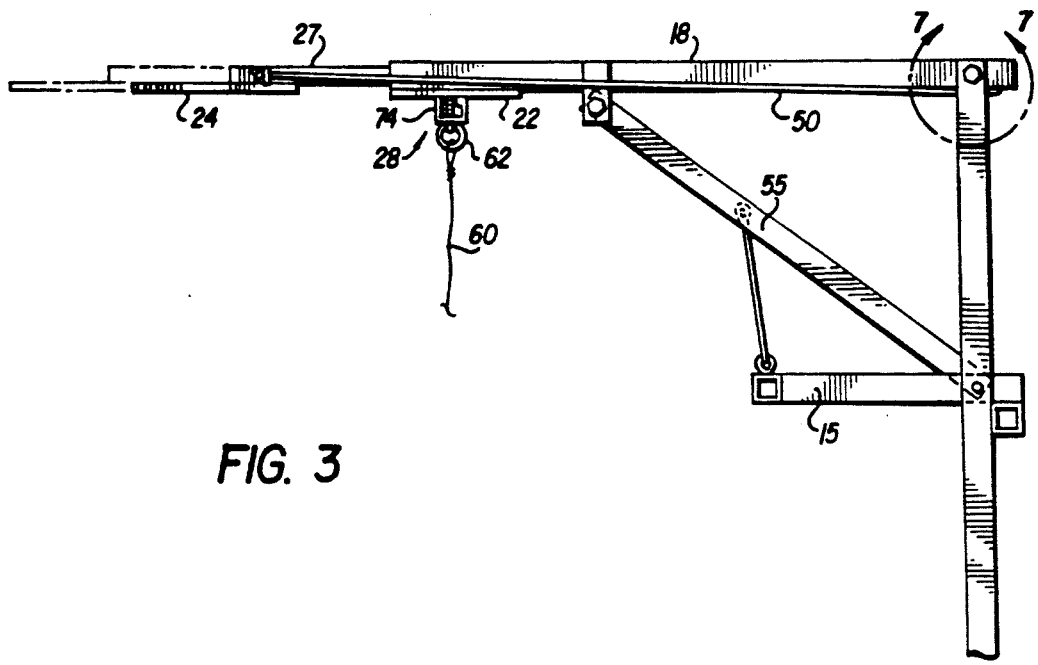
FIG. 3 is a side elevation view of the platform section of the second embodiment of the present invention.

Although the biasing member 50 shown in FIGS. 3 and 4 is installed outside the climbing member 12, it is contemplated that such biasing member may be captured entirely within the walls of the support arm 27, so as to limit or prevent exposure to snagging, weather, abrasion, or other wear or performance compromising factors. For either arrangement, instead of an elastic cord, other resilient members such as a spring can be substituted.

Figure 6:
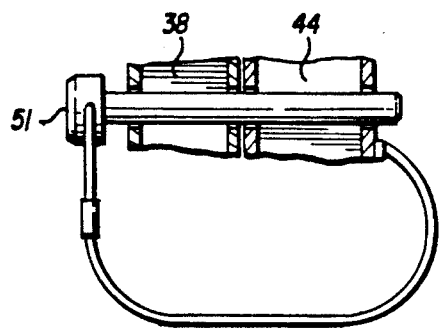
FIG. 6 is a sectional view of the ladder section locking pin assembly of the present invention.

Ladder section 14 is comprised of three hingedly connected ladder sub-sections 36, 38 and 40. Section 38 is hingedly connected to section 40 by a pair of bolts 41, 42 about which section 38 may pivot relative to section 40. As is clear from the illustrations in FIGS. 1 and 2, the width of ladder section 38 is less that that of section 40 such that the parallel sidepieces of section 38 may nest within the sidepieces of section 40. Similarly, ladder section 36 is nested within the parallel sidepieces of section 38 and is hingedly mounted thereto about bolts 44, 45. The ladder sections may be locked in their extended positions by removeable tethered pins 51 (FIG. 6). By removing pin 51, the ladder sections may be folded into one another for ease in transport or storage.

Ladder section 14 is pivotably mounted to platform section 12 by nut and bolt sets 53 or a similar attachment means- The perpendicular orientation of sections 12 and 14 may be maintained by a pair of struts or braces 55, 57. The braces are pivotably mounted by a nut and bolt set at their distal ends to ladder section 36 adjacent the first rung. At their proximal ends, braces 55, 57 are each slidably mounted to tubular member 18 by a collar 59.

The apparatus described herein can be made of any suitable material which is reasonably lightweight and durable and capable of supporting a user of typical weight and physical dimensions. The apparatus is preferably made of welded tubular steel or aluminum steel having a rectangular or square cross section so as to provide a flat or level horizontal surface. The resilient members can be of any suitable material such as elastic or rubber or the like, or suitable spring metals, if springs are used.

The use and operation of the apparatus of the present invention may be described as follows: A user carries the ladder stand 10 or 11 in the folded position on his back until he reaches the tree which he desires to climb. The device is then removed from the user's back and placed on the ground. Each of the three ladder sections 36, 38, and 40 are then unfolded into an extended position and locking pins 51 are passed through the apertures in each section to lock the ladder in the extended position. Platform member 12 is then pulled away from ladder section 36 until it is oriented in a generally perpendicular position relative to the ladder. The platform member 12 is held in this position by the frictional engagement of collars 59 with tubular member 18. To spread jaws 22, 24 so that the throat 25 may be opened sufficiently to receive the tree, the user first disengages locking assembly 28 by pulling ring 62. Jaw 24 is then pulled away from opposing jaw 22 against the bias of resilient cord 50 until the opening between the jaw members 22, 24 exceeds the diameter of the tree trunk at the height the platform will be placed. The jaws are then locked in this open position by pin 66 which engages one of the plurality of holes 82 in the support arm 27. The ladder stand 10 is now ready to be placed on the tree. The user preferably grasps the side rails of the middle ladder section 38 using two hands, lifts the entire stand, and orients it such that the tree is positioned intermediate the jaws 24.

The moveable jaw 24 is then released to securely engage the tree by releasing the locking pin 66 via cord 60. The support arm 27 immediately slides towards member 18 in which it is telescopically fitted carrying jaw 24 into engagement with the tree. The plurality of spaced holes provided a support arm 27 allows pin 66 to lock support arm 27 in position that engages jaw 24 with the tree, irrespective of the size of the trunk.

Once the platform 12 is firmly secured to the tree, the user may now climb up (or down) the ladder without the risk of it toppling during his climb. The user can remain on the platform with out fear that the platform will tilt or disengage, irrespective of the position, orientation, or strength of the ladder.

It is a particular feature of the present invention that the above-described manner of securing platform 12 to the tree is accomplished while the user is on the ground, thereby allowing safe ascent and descent.

After the user climbs down from the ladder, the ladder stand is removed from the tree as follows. Locking device 28 is actuated by pulling cord 60, thereby disengaging pin 66 from the holes in support arm 27. While pin 66 is maintained in a disengaged position jaw 24 is moved away from the tree by grasping one or more rungs of the ladder 14 and pulling the entire device away from the tree. After the opening (or throat) between the jaw members 22, 24 exceeds the diameter of the tree trunk, pin 66 is released to mate with an adjacent hole 82 on support arm 27. The stand may then be removed from the tree.

Although certain presently preferred embodiments of the invention have been described herein, it will be apparent to those skilled in the art to which the invention pertains that variations and modification of the described embodiments may be made without departing from the spirit and scope of the invention. Accordingly, it is intended that the invention be limited only to the extent required by the appended claims and the applicable rules of law.

What is claimed:

1. Apparatus for securely engaging an upright columnar member for supporting a user above the ground, at a height beyond the user's reach when the user is standing on the ground comprising:

a ladder;

a platform secured to said ladder for accommodating the body of a user above the ground, said platform having a gripping device for securing said platform to the columnar member at a height beyond the user's reach when the user is standing on the ground;

said gripping device comprising a first jaw member for confronting a first side of said columnar member, said first side being the side from which said platform extends outwardly therefrom, a second jaw member for gripping a second side of said columnar member, said second side being substantially opposite to said first side, wherein said first and second jaws only partially encircle the columnar member so as to define an opening through which said columnar member may be engaged or disengaged;

an adjustment device including a resilient member for automatically moving one of said jaws towards the other jaw so as to engage said columnar member there between;

a releasable locking member for fixing movement of said jaws, said locking member being remotely actuatable by the user while standing on the ground; a member for remotely actuating said locking member;

whereby the user can secure the jaws of said apparatus and said platform to the columnar member before ascending said ladder and can thereafter release the jaws and platform from said columnar member after descending to the ground to disengage the apparatus from said columnar member.

2. The apparatus according to claim 1, wherein said resilient member comprises an elastic cord.

3. The apparatus according to claim 2, wherein said cord is attached at one end to said platform and at the opposite end to said moveable jaw.

4. The apparatus according to claim 3, wherein said elastic cord is replaceable.

5. The apparatus according to claim 1, wherein said resilient member comprises a spring.

6. The apparatus according to claim 1, said locking member for securing said moveable jaw to a first position and thereafter to a second position by releasing said locking member thereby permitting said adjustment device to automatically move said.

7. The apparatus according to claim 1, said platform further comprising a locking member for securing said jaw to a first position and thereafter to a second position by releasing said locking member thereby permitting said adjustment device to automatically move said jaw.

8. The apparatus according to claim 2, further comprising a locking member for securing said jaw in a first position and thereafter in a second position by releasing said locking member thereby permitting said adjustment device to automatically move said jaw.

9. The apparatus according to claim 5, further comprising a locking member for securing said jaw to a first position and thereafter to a second position by releasing said locking member thereby permitting said adjustment device to automatically move said jaw.

10. Apparatus according to claim 1, wherein said platform includes a fixed jaw for engaging the front surface of said columnar member.

11. The apparatus according to claim 1, further including a support arm moveably secured to said platform; said second jaw being fixed to said support arm, said support arm including a plurality of said spaced openings; a locking device mounted to said platform including a spring biased pin for engaging one of said openings in said support arm so as to fix said second jaw and support arm relative to said platform.

12. The apparatus according to claim 11, wherein said spring biased pin is remotely operated.

13. The apparatus according to claim 12, wherein the actuating member comprises a long cord operatively connected for said locking device to remotely operate said pin.

14. The apparatus according to claim 1, further including backpack straps secured to said platform which permits the apparatus to be worn over the shoulders of a user for carrying said apparatus on the back of said user.

* * * * *